United States Patent [19]
Elliott

[11] 3,759,367
[45] Sept. 18, 1973

[54] MAGNETIC ARTICLE SORTING APPARATUS

[76] Inventor: Eldon G. Elliott, 32428 Maryland, Livonia, Mich. 48150

[22] Filed: May 13, 1971

[21] Appl. No.: 142,954

[52] U.S. Cl. .................................. 198/41, 198/213
[51] Int. Cl. ............................................ B65g 17/46
[58] Field of Search .......................... 198/41, 213; 209/219, 220, 221, 215; 210/222, 223, 221

[56] References Cited
UNITED STATES PATENTS

| | | | |
|---|---|---|---|
| 2,940,583 | 6/1960 | Lovercheck | 198/41 |
| 2,964,182 | 12/1960 | Spurlin | 198/220 BC |
| 3,667,591 | 6/1972 | Sykes | 198/220 BC |

FOREIGN PATENTS OR APPLICATIONS

| | | | |
|---|---|---|---|
| 1,130,363 | 5/1962 | Germany | 198/41 |
| 1,206,926 | 2/1960 | France | 198/41 |

*Primary Examiner*—Richard E. Aegerter
*Attorney*—Owen E. Perry

[57] ABSTRACT

Apparatus for handling articles by magnetic attraction including an elongated hollow casing of nonmagnetic material, an elongated magnetic core assembly rotatably received in said casing, and a ramp of nonmagnetic material wound spirally around the casing for causing articles attracted by the magnetic core assembly to advance along the length of the casing and upon rotation of the core assembly relative to the casing.

18 Claims, 3 Drawing Figures

Patented Sept. 18, 1973

3,759,367

INVENTOR.
Eldon G. Elliott
BY
Barnard, McGlynn & Reising
ATTORNEYS

MAGNETIC ARTICLE SORTING APPARATUS

This invention relates generally to article handling apparatus and is particularly concerned with magnetic article sorting, parts handling, and/or parts storage apparatus and systems.

There are many industrial processes wherein it is necessary to separate ferrous, or magnetically attractive material, from nonmagnetic material. Frequently, it is necessary to separate metal particles, chips and filings from a liquid slurry for the purpose of cleaning the liquid and also for recovering the metal particles.

There are also frequent occasions when it is necessary to remove small metal parts, such as bolts, bearings, rivets, and the like from a storage area, and sort and transmit the parts to another storage area, or to other collection bins and/or assembly areas or conveyors.

Such operations lend themselves to the use of magnetism for separating and sorting the magnetically attractive material or articles. Several prior art devices are disclosed wherein magnetically attractive particles are caused to move in a helical or spiral path by magnetic force. See, for example, U. S. Pat. Nos. 572,369; 736,298; and 2,728,722.

An object of this invention is to provide apparatus for handling articles by magnetic attraction wherein the articles move along a spiral ramp wound around a casing of nonmagnetic material having good corrosion and wear resistant properties in which is rotatably received a magnetic core assembly for causing the articles to advance along the length of the casing upon rotation of the magnetic core assembly.

Another object is to provide apparatus for handling small articles or parts of magnetically attractive material by rotating a magnetic core assembly within a casing of nonmagnetic material with means provided on the outer surface of the casing to cause the articles to advance along the length of the casing in response to rotation of the magnetic core assembly.

In carrying out the foregoing, and other objects, apparatus according to the present invention includes an elongated hollow casing of nonmagnetic material with an elongated magnetic core assembly rotatably received in the casing. A ramp of nonmagnetic material is wound spirally around the casing for causing articles attracted by the magnetic core assembly to advance along the length of the casing upon rotation of the core assembly relative to the casing.

The pitch of the spiral ramp may vary such that the distance between adjacent coils of the ramp progressively decreases at one end of the ramp to thin the articles out into a single layer when they reach the discharge end of the apparatus.

The casing is cylindrical, and the ramp extends radially outwardly from the casing and is wound in a helical or spiral path around the casing. A plurality of rollers is mounted on the magnetic core assembly and engages the inner surface of the casing to provide transverse support for the magnetic core assembly, and also to prevent the casing from collapsing from the force exerted by the articles due to the magnetic attraction of the magnetic core assembly as the articles are moved along the length of the casing.

At the discharge end of the spiral ramp, a collection tray or shelf is formed and includes a divider separating the shelf into a plurality of guideways. The articles can then be grouped on opposite sides of the divider and fed through a discharge chute to storage, collection bins or assembly stations. An alternating current demagnetizing coil may be mounted in the path of the articles in such a manner that the articles discharged from the spiral ramp pass through the field of the demagnetizing coil so that the molecules of the articles are disoriented to destroy any magnetism created in the articles by the magnetic core assembly.

Other objects, advantages and features of the invention will become apparent from the following description taken in connection with the accompanying drawings in which.

Figure 1:
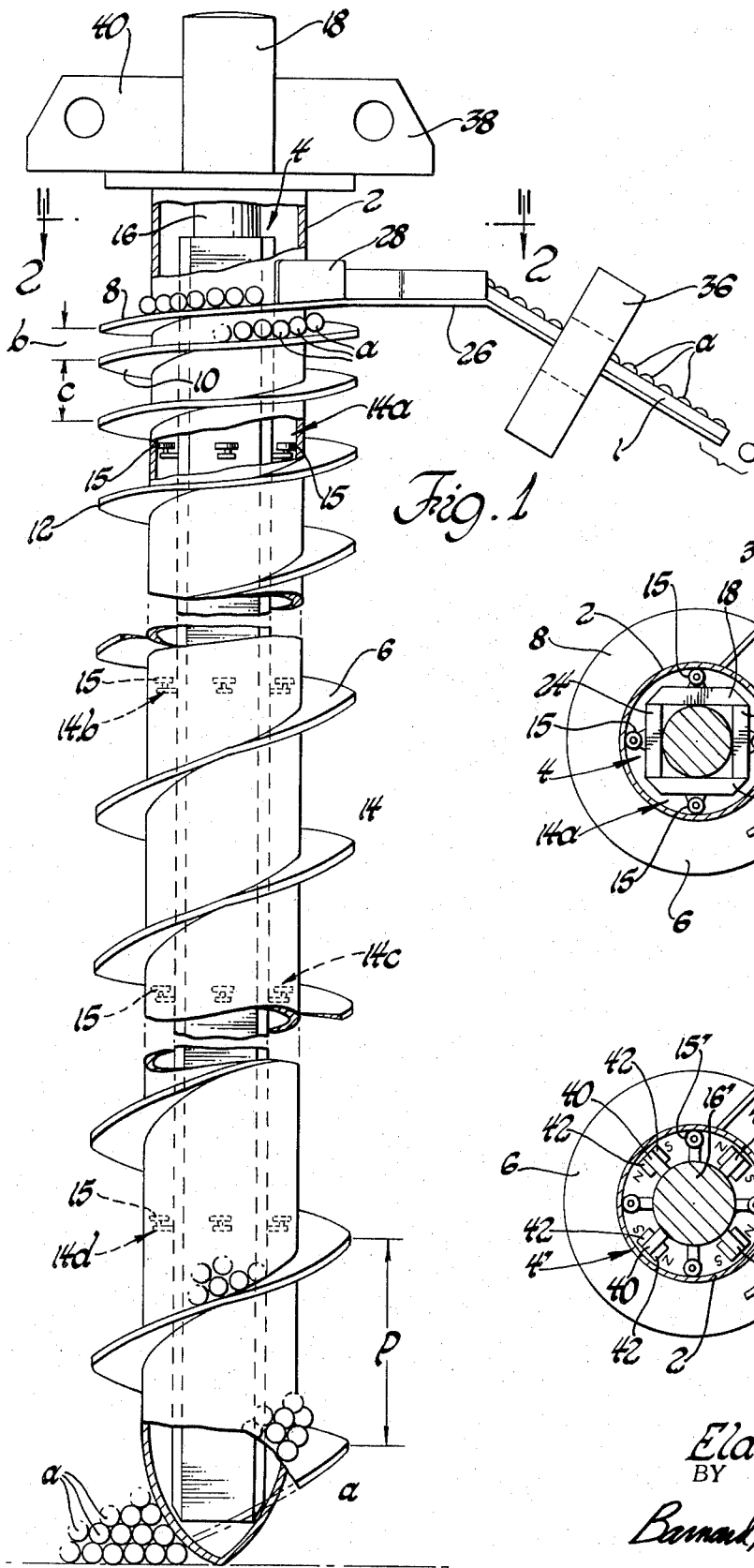
FIG. 1 is an elevational view, partially in section, of apparatus embodying the invention.

The drawings illustrate apparatus according to the invention as used to transfer parts $a$ from a supply at the lower end of the apparatus to a chute 1 at the upper end of the apparatus. The apparatus shown in the drawing shows an elongated hollow casing 2 of nonmagnetic material with an elongated magnetic core assembly designated collectively by reference numeral 4 rotatably received in the casing 2. A ramp or flight of nonmagnetic material is wound helically or spirally around the casing 2 for causing the articles $a$ attracted by the magnetic core assembly 4 to advance along the length of the casing 2 upon rotation of the magnetic core assembly 4 relative to the casing 2.

As shown in FIG. 1, the pitch P of the ramp 6 varies such that the distance between adjacent coils of the ramp progressively decrease at one end of the ramp, that is, the end adjacent the chute 1. Thus, the distance $b$ between coils 8 and 10 of the ramp 6 at the upper end of the casing 2 is less than the distance $c$ between the coils 10 and 12. The distance between adjacent pairs of the coils progressively decreases toward the upper end of the casing 2 to the minimum distance $b$ between the coils 8 and 10.

As shown in the drawings, the casing 2 is cylindrical with a circular cross-section, and the ramp extends radially outwardly from the casing 2 to provide a support for the articles $a$ attracted to the outer surface of the casing 2 by the magnetic force of the core assembly 4.

Figure 2:
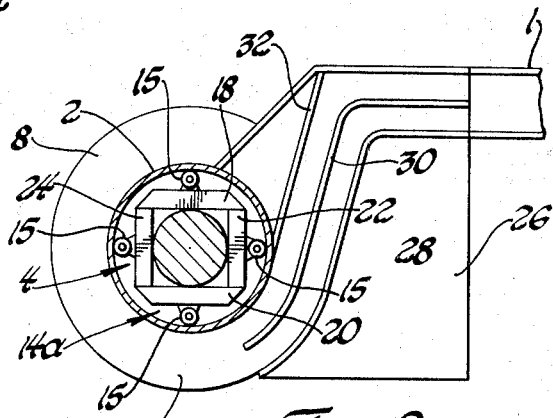
FIG. 2 is a sectional view taken on lines 2—2 of FIG. 1.

A plurality of rollers are mounted on the core assembly and engage the inner surface of the casing 2 to provide support for the core assembly in a direction transverse to the axis of the casing 2, and to prevent the casing from collapsing inwardly from the force exerted by the articles $a$ due to the attraction of the magnetic core assembly. As shown in FIG. 1, a plurality of sets of rollers 14$a$, 14$b$, 14$c$, and 14$d$ are spaced axially along the length of the core assembly 4. Each of the sets of rollers comprises a plurality of rollers 15 spaced angularly from each other about the rotary axis of the core assembly 4. For example, as shown in FIG. 2, four rollers 15 are shown for the set 14$a$, the rollers 15 in FIG. 2 being spaced angularly from each other 90° about the rotary axis of the core assembly 4.

The core assmbly 4 comprises a shaft 16 drivingly engaged with a motor 18 such that energization of the motor 18 causes rotation of the shaft 16. Magnetic means is secured to the shaft 16. In the form shown in FIGS. 1 and 2, the magnetic means includes a pair of elongated steel support bars 18 and 20 mounted on diametrically opposed sides of the axis of shaft 16 and extending along the length of the casing 2; and a pair of elongated magnetic bars 22 and 24 mounted between the support bars 18 and 20 on diametrically opposite sides of the axis of shaft 16 and extending along the length of the casing. The magnets 22 and 24 in the illustrated embodiments are permanent magnets and are oriented with respect to each other such that the support bar 18 becomes the north pole of the assembly and the support bar 20 becomes the south pole of the assembly. It is, of course, within the scope of the invention to use electromagnets instead of permanent magnets.

A collection tray 26 is formed at the discharge end of the ramp 6, that is, the end including the upper coil 8 in FIG. 1. Articles a are delivered onto the collection tray 26 from the ramp 6. Dividers 28, 30 and 32 project from the collection tray 26 to form a plurality of guideways for grouping the articles a on opposite sides of the dividers. The articles are separated into groups and fed onto the chute 1.

As shown in FIG. 1, the chute 1 may pass through an alternating current demagnetizing coil 36 so that articles a moving along the chute 1 will be subjected to the pulsating current from the coil 36 to disorient the molecules of the articles and thus demagnetize the articles.

Support brackets 38 and 40 may be mounted on the upper end of the casing 2 as viewed in FIG. 1 for suspending the apparatus vertically with the lower end positioned in a supply of the articles a to be elevated to the discharge chute 1. The magnetic core assembly 4 will attract the articles a to the outer surface of the casing 2. Rotation of the core assembly in a counterclockwise direction as viewed in FIG. 2 will cause the articles a to advance along the length of the casing 2 and move along the spiral ramp 6 to the upper end of the casing 2. As the articles move to the upper end, the decreasing pitch of the spiral ramp 6 will cause the articles a to form into a single layer on coils 8 and 10 as shown in FIG. 1, depending of course upon the size of the articles a. The articles are caused to move into the guideways of the collection tray 26 and down the discharge chute 1 to a selected destination. Magnetism in the articles a caused by the core assembly 4 can be removed by the demagnetizing coil 36.

The casing 2 and the spiral ramp 6 may be of nonmagnetic material having high resistance to corrosion and wear, or to chemical action in situations where the apparatus is to be employed to separate magnetic material from caustic chemical baths and the like.

Figure 3:
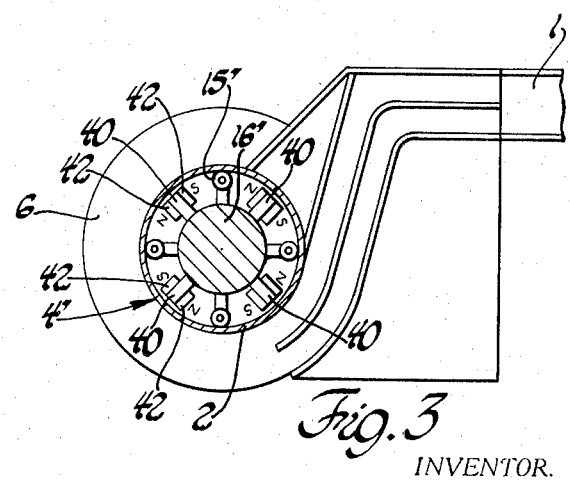
FIG. 3 is a view similar to FIG. 2 of an alternative construction.

In the embodiment of FIG. 3, the core assembly 4' comprises a shaft 16' with a plurality of sets of magnetic support arms 40, each set comprising four magnetic support arms 40 spaced angularly from each other about the rotary axis of the core assembly 4'. In FIG. 3, four support arms 40 are shown spaced 90° apart about the axis of the shaft 16'. Magnets 42 are mounted on the support arms 40 in such a manner that the north pole of the magnet of one of the arms 40 is adjacent to the south pole of the magnet of the adjacent support arm 40. Rollers 15', similar in construction to the rollers 15 of the FIG. 2 embodiment, are also provided on a shaft 16' in the embodiment of FIG. 3.

The assembly shown in the FIG. 3 embodiment is particularly suitable for moving groups of articles along the ramp 6 such that each group can be delivered to the collection tray by selectively indexing the shaft 16 about its rotary axis. Thus, each of the magnet assemblies 42 may have a field strong enough to attract a particular number, or a group of articles containing a number of articles lying within a known range, so that the groups can be moved individually onto the collection tray 26 if desired.

Both embodiments shown in the drawing can be reversed so that the pitch decreases from top to bottom instead of from bottom to top as illustrated. This would be particularly suitable when the apparatus is used for storage of parts, and selective release of the stored parts onto separate conveyors or chutes to individual automatic assembly machines.

While specific embodiments of the invention have been illustrated in the accompanying drawings and described in the foregoing specification, it should be understood that the invention is not limited to the specific construction shown. Alternatives in the construction and arrangement of parts, all falling within the scope and spirit of the invention, will be apparent to those skilled in the art.

The embodiments of the invention in which an exclusive property or privilege is claimed are defined as follows:

1. Apparatus for handling articles by magnetic attraction comprising: an elongated, hollow, cylindrical casing of non-magnetic material, said casing having a continuous, uninterrupted outer surface throughout its length; an elongated magnetic core assmbly rotatably received in said casing; means for rotating said assembly and a ramp of non-magnetic material wound spirally around the outside of said casing and extending radially outwardly from said casing, said core assembly being operable upon rotation relative to said casing to attract articles to the outer surface of said casing and cause the articles to rotate about the axis of said casing while remaining on said outer surface, said ramp causing said articles to advance along the length of said casing in response to rotation of said core assembly.

2. Apparatus as claimed in claim 1 wherein the pitch of said ramp varies such that the distance between adjacent coils of said ramp progressively decreases at one end of said ramp.

3. Apparatus as claimed in claim 2 including a collection tray formed on said one end of said ramp for receiving articles from said ramp.

4. Apparatus as claimed in claim 3 including at least one divider projecting from said tray for grouping articles on opposite sides thereof on said tray.

5. Apparatus as claimed in claim 4 further including a discharge chute on said tray.

6. Apparatus as claimed in claim 5 further including demagnetizing means on said discharge ramp.

7. Apparatus for handling articles by magnetic attraction comprising: an elongated hollow casing of nonmagnetic material; an elongated magnetic core assembly rotatably received in said casing; means for rotating said assembly a ramp of nonmagnetic material wound spirally around said casing for causing articles attracted by said core assembly to advance along the length of said casing upon rotation of said core assembly relative to said casing; the pitch of said ramp varying such that the distance between adjacent coils of said ramp progressively decreases at one end of said ramp, said casing being cylindrical and said ramp extending radially outwardly from said casing; and a plurality of rollers mounted on said core assembly and engaging the inner surface of said casing to provide support for said core assembly in a direction transverse to the axis of said casing.

8. Apparatus as claimed in claim 7 wherein said plurality of rollers comprises a plurality of sets of rollers spaced axially along the length of said core assembly.

9. Apparatus as claimed in claim 8 wherein each of said sets of rollers comprises a plurality of rollers spaced angularly from each other about the rotary axis of said core assembly.

10. Apparatus as claimed in claim 9 wherein said core assembly comprises a shaft of nonmagnetic material, and magnetic means secured to said shaft.

11. Apparatus as claimed in claim 9 wherein said core assembly comprises a shaft; a pair of elongated support bars mounted on diametrically opposed sides of the axis of said shaft and extending along the length of said casing; and a pair of elongated magnetic bars mounted between said support bars on diametrically opposite sides of the axis of said shaft and extending along the length of said casing.

12. Apparatus as claimed in claim 11 wherein the pitch of said ramp varies such that the distance between adjacent coils of said ramp progressively decreases at one end of said ramp.

13. Apparatus as claimed in claim 9 wherein said core assembly comprises: a shaft; a plurality of axially spaced sets of magnet support arms on said shaft; and at least one magnet carried by each of said magnet support arms.

14. Apparatus as claimed in claim 13 wherein each set of magnet support arms comprises a plurality of magnet support arms spaced angularly from each other about the rotary axis of said core assembly.

15. Apparatus as claimed in claim 14 wherein the pitch of said ramp varies such that the distance between adjacent coils of said ramp progressively decreases at one end of said ramp.

16. Apparatus for handling articles by magnetic attraction comprising: an elongated hollow casing of nonmagnetic material; an elongated magnetic core assembly rotatably received in said casing; means for rotating said assembly a ramp of nonmagnetic material wound spirally around said casing for causing articles attracted by said core assembly to advance along the length of said casing upon rotation of said core assembly relative to said casing, said core assembly comprising a shaft; a pair of elongated support bars mounted on diametrically opposed sides of the axis of said shaft and extending along the length of said casing; and a pair of elongated magnetic bars mounted between said support bars on diametrically opposite sides of the axis of said shaft and extending along the length of said casing.

17. Apparatus for handling articles by magnetic attraction comprising: an elongated hallow casing of non-magnetic material; an elongated magnetic core assembly rotatably received in said casing; means for rotating said assembly and a ramp of non-magnetic material wound spirally around the outside of said casing for causing articles attracted by said core assembly to advance along the length of said casing upon rotation of said core assembly relative to said casing, said core assembly comprising: a shaft; a plurality of axially spaced sets of magnet support arms on said shaft; and at least one magnet carried by each of said magnet support arms.

18. Apparatus as claimed in claim 17 wherein each set of magnet support arms comprises a plurality of magnet support arms spaced angularly from each other about the rotary axis of said core assembly.

* * * * *